US010514882B2

(12) United States Patent
Mollis et al.

(10) Patent No.: US 10,514,882 B2
(45) Date of Patent: Dec. 24, 2019

(54) DIGITAL AUDIO PROCESSING SYSTEM FOR ADJOINING DIGITAL AUDIO STEMS BASED ON COMPUTED AUDIO INTENSITY/CHARACTERISTICS

(71) Applicant: Microsoft Technology Licensing, LLC, Redmond, WA (US)

(72) Inventors: Adam Thomas Mollis, Seattle, WA (US); Brendan Mitchel Walsh, Seattle, WA (US); George Valavanis, Seattle, WA (US); Ines Khelifi, Redmond, WA (US); Jonathan A. Adams, Duvall, WA (US); Laurentiu Titi Nedelcu, Redmond, WA (US); Ahmed Raouf Merouche, Seattle, WA (US); Sourabh Bansal, Kirkland, WA (US); Sung-Hon Wu, Issaquah, WA (US); Stacey W. Y. Law, Krikland, WA (US); Ted T. Chen, Seattle, WA (US); Duncan Og MacConnell, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/901,801

(22) Filed: Feb. 21, 2018

(65) Prior Publication Data

US 2019/0258448 A1    Aug. 22, 2019

(51) Int. Cl.
*G06F 17/00* (2019.01)
*G06F 3/16* (2006.01)
*G06F 3/0484* (2013.01)

(52) U.S. Cl.
CPC ............ *G06F 3/16* (2013.01); *G06F 3/04842* (2013.01)

(58) Field of Classification Search
CPC ......... G06F 3/16; G06F 3/04842; G06F 3/165
See application file for complete search history.

(56) References Cited

U.S. PATENT DOCUMENTS 6,072,480 A * 6/2000 Gorbet ................ G06F 16/40
715/730
7,383,509 B2  6/2008 Hilbert et al.
(Continued)

FOREIGN PATENT DOCUMENTS

WO    2015154159 A1    10/2015

OTHER PUBLICATIONS

"Stems Is for Producers", Retrieved from <<https://web.archive.org/web/20150624232247/http:/www.stems-music.com/stems-is-for-producers/>>, Jun. 24, 2015, 2 Pages.
(Continued)

*Primary Examiner* — Fan S Tsang
*Assistant Examiner* — David Siegel
(74) *Attorney, Agent, or Firm* — Newport IP, LLC; Mike R. Cicero

(57) ABSTRACT

A digital audio processing system determines characteristics of an electronic presentation to generate a musical composition that is unique to the electronic presentation by adjoining digital audio stems in accordance with the characteristics of the electronic presentation. Embodiments enable a user to define an order for displaying images and a level of importance of the images with respect to one another. For example, the user may designate a specific one of the multiple images as a "highlight image" for emphasizing during the electronic presentation. Then, the system may arrange numerous musical segments adjacent to one another so that the intensity (e.g., energy level) of a resulting musical composition coincides with key events (e.g., a highlight image being shown) of the particular electronic presentation.

(Continued)

The intensity of a particular musical segment may indicate a relative note structure density as compared to other musical segments that are defined within the stem data.

20 Claims, 7 Drawing Sheets

(56) References Cited

U.S. PATENT DOCUMENTS

| | | | |
|---|---|---|---|
| 9,179,236 B2 | 11/2015 | Robinson et al. | |
| 9,230,552 B2 | 1/2016 | Soroka et al. | |
| 2006/0204214 A1* | 9/2006 | Shah | G11B 27/034 386/282 |
| 2009/0281908 A1 | 11/2009 | Wong | |
| 2010/0082768 A1 | 4/2010 | Edwards et al. | |
| 2010/0095829 A1 | 4/2010 | Edwards | |
| 2010/0257994 A1* | 10/2010 | Hufford | G10H 1/0025 84/609 |
| 2014/0320697 A1* | 10/2014 | Lammers | H04N 5/76 348/231.99 |
| 2017/0330544 A1 | 11/2017 | Jaeger et al. | |
| 2018/0226063 A1* | 8/2018 | Wood | G11B 27/031 |

OTHER PUBLICATIONS

Bugge, Magnus, "Synthesised Sound & Synthesised Composition: Composing Electronic Music with Computer Assisted Composition", In Master's Thesis in Music Theory: Music Technology, Oct. 1, 2014, 72 Pages.

Schnepf, et al., "Doing FLIPS: FLexible Interactive Presentation Synchronization", In IEEE Journal on Selected Areas in Communications, vol. 14, Issue 1, Jan. 14, 1996, pp. 1-25.

"International Search Report and Written Opinion Issued in PCT Application No. PCT/US19/017564", dated Apr. 3, 2019, 13 Pages.

West, Moira, "How to Choose Music for Videos in the Animoto Mobile App", Retrieved From: https://animoto.com/blog/news/choose-music-videos-mobile-app/, Feb. 2, 2017, 11 Pages.

* cited by examiner

MUSICAL SEGMENT 102(1)

| INTENSITY LEVEL = 1 | |
|---|---|
| VOLUME | 15 % |
| TEMPO (BEATS PER MINUTE) | 120 |

DURATION = 4 BAR

STEM SEGMENT 104(1)(1)

| MUSICAL TYPE 202(1) | DRUMS |
|---|---|
| COMPLEXITY ARRAY 204(1) | [1, 2, 3, 4] |

STEM SEGMENT 104(1)(2)

| MUSICAL TYPE 202(2) | BASS |
|---|---|
| COMPLEXITY ARRAY 204(2) | [2, 3, 4] |

STEM SEGMENT 104(1)(3)

| MUSICAL TYPE 202(3) | HARMONY |
|---|---|
| COMPLEXITY ARRAY 204(3) | [3, 4] |

STEM SEGMENT 104(1)(4)

| MUSICAL TYPE 202(4) | MELODY |
|---|---|
| COMPLEXITY ARRAY 204(4) | [4] |

FIG. 2

DIGITAL AUDIO PROCESSING SYSTEM FOR ADJOINING DIGITAL AUDIO STEMS BASED ON COMPUTED AUDIO INTENSITY/CHARACTERISTICS

BACKGROUND

Some slide presentation programs are designed to enable a user to arrange slides (e.g., images) of a presentation to coincide with a user selected audio file(s). For example, a user may manually select a plurality of images and an audio file for generating a slide-show type presentation. Once selected, the user may arrange the plurality of images into a desired order to be displayed. Some slide presentation programs allow users to manually set durations for displaying each individual image and even transition times to switch from a first user selected audio file to a second user selected audio file. Using these techniques, users can generate pleasing slideshows that graphically display user selected images in a manner that is audibly synchronized with classic songs that an audience may know and love.

Unfortunately, because the user selected audio files are static in nature, users may expend significant time and effort rearranging slides and setting slide durations to match the user selected audio track. Even skilled presentation builders often become frustrated as in many situations a selected music track may trail off too early (e.g., the song may die out while the presentation continues to progress through slides) or may be cut short (e.g., the allotted presentation time may be shorter than the track's running time).

These inefficiencies result in exorbitant numbers of iterative versions of an electronic presentation being generated as users struggle to fine tune their work. Generation of each iterative version causes additional processing cycles and consumes additional amounts of memory. Furthermore, storage of each iterative version consumes additional amounts of the inherently limited storage that is available on individual computing devices. Furthermore, in some scenarios where the presentation versions are backed up in a "cloud-based" storage service, each iterative version may consume additional network bandwidth resources while it is uploaded into the "cloud."

It is with respect to these considerations and others that the disclosure made herein is presented.

SUMMARY

The present invention enables a system to generate musical compositions that are unique to individual electronic presentations by arranging musical segments according to the importance of various slides of the electronic presentations.

Implementation of the techniques described herein mitigate the need for rearranging slides and manually setting slide durations to match or otherwise coincide with selected music (e.g., which results in the inefficiencies described above). For example, rather than being forced to tailor the electronic presentation to the selected music, according to the techniques described herein musical compositions are dynamically generated that are uniquely tailored to the electronic presentation. Among many other benefits, the techniques herein improve efficiencies with respect to various computing resources (e.g., processors, memory, non-volatile storage, etc.) for at least the reason that electronic presentations and corresponding digital musical compositions may be closely and specifically tailored to one another with few, if any, iterations. Thus, implementations of the techniques herein effectively reduce the number of processing cycles triggered and usage of memory and non-volatile storage as compared to existing electronic presentation applications.

Generally described, embodiments of the present invention enable a user to select multiple images and to define an order in which to display the images during an electronic presentation. Embodiments further enable a user to indicate a level of importance for one or more individual images. For example, the user may designate a specific one of the multiple images selected as a "highlight image" for emphasizing during the electronic presentation.

A system may receive stem data that defines numerous musical segments that can be adjoined in various orders to form unique musical compositions. The stem data may define intensity values for individual musical segments so that the intensity (e.g., energy level) of a musical composition that is created for a particular electronic presentation can coincide with key events (e.g., a highlight image being shown) of the particular electronic presentation.

In some implementations, the intensity of a particular musical segment may indicate a relative note structure density as compared to other musical segments that are defined within the stem data. For example, a musical segment that has a relatively higher intensity than another musical segment may be designed to have a relatively higher musical tempo than the other musical segment. Thus, the pace of a musical composition may increase or decrease as the intensity level of musical segments that are currently being played increases or decreases, respectively. Additionally, or alternatively, the intensity of a particular musical segment may indicate a relative volume as compared to other musical segments. For example, a musical segment that has a relatively higher intensity than another musical segment may be played at a relatively higher volume (e.g., decibel level) than the other musical segment.

Individual musical segments may include multiple stem segments that may be played individually and/or concurrently depending on a complexity level that is assigned to individual composition slots of a musical composition. Exemplary stem segments include, by are not limited to, drum stems, bass stems, harmony stems, and/or melodic stems. Thus, if a complexity level for a particular composition slot is relatively higher than another composition slot, then a greater number of stem segments may be concurrently played during the particular composition slot as compared to the other composition slot.

The system may enable a user to arrange multiple images into a desired order and also to indicate which individual image(s) are "highlight" images. Then, the system sets durations for individual composition slots. For example, the system may fill a total composition duration (e.g., a total running time for the electronic presentation) with multiple four bar composition slots and then fill in any gaps with relatively shorter composition slots (e.g., three bar segments or one bar segments). The system may also assign individual intensity levels to these composition slots based on the importance of various slides that are to be displayed during these composition slots. In some implementations, the system may assign a highest intensity value to a particular composition slot that corresponds to a user defined "highlight" image and may assign decreasing intensity levels as the segments increase in distance from the "highlight" image. Thus, a musical composition may have an intensity curve that reaches a maximum level in association with the "highlight" image.

This technique enables the system to form a musical crescendo in association with the "highlight" image. For example, the energy of the musical composition may gradually build up before maxing out at the "highlight" image and then gradually decreasing as the electronic presentation comes to an end. Accordingly, the disclosed techniques enable the creation of completely unique musical compositions that are specifically tailored to a particular electronic presentation to dynamically match an energy of the musical composition to an importance of the various slides. Furthermore, as described above, implementations of the disclosed techniques effectively reduce the exorbitant numbers of iterations of electronic presentations that are typically generated (and often unnecessarily stored rather than being discarded) prior a final version having slide transitions and energy levels that appropriately coincide with a music selection. It can be appreciated, therefore, that the disclosed techniques improve computing efficiencies by reducing processing cycles, memory usage, non-volatile storage usage, and in many cases network bandwidth (e.g., since few electronic presentations versions are unnecessarily uploaded to the "cloud").

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual partitions and/or sub-portions of transactions and/or prefetch buffers may be distinguished by numerical designations without such designations corresponding to the claims or even other paragraphs of the Summary and/or Detailed Description. For example, any designation of a "first intensity level" and "second intensity level" within a paragraph of this disclosure is used solely to distinguish two different intensity levels within that specific paragraph—not any other paragraph and particularly not the claims.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items.

References made to individual items of a plurality of items can use a reference number followed by a parenthetical containing a number of a sequence of numbers to refer to each individual item. Generic references to the items may use the specific reference number without the sequence of numbers.

As used herein, the use of "N" within a parenthetical simply represents any value that is greater than one. Reference to multiple particular items as having "N" instances does not indicate that these items necessarily have the same number of instances.

FIG. 2 illustrates an exemplary musical segment that includes multiple stem segments of a particular intensity level and duration.

DETAILED DESCRIPTION

Figure 1:
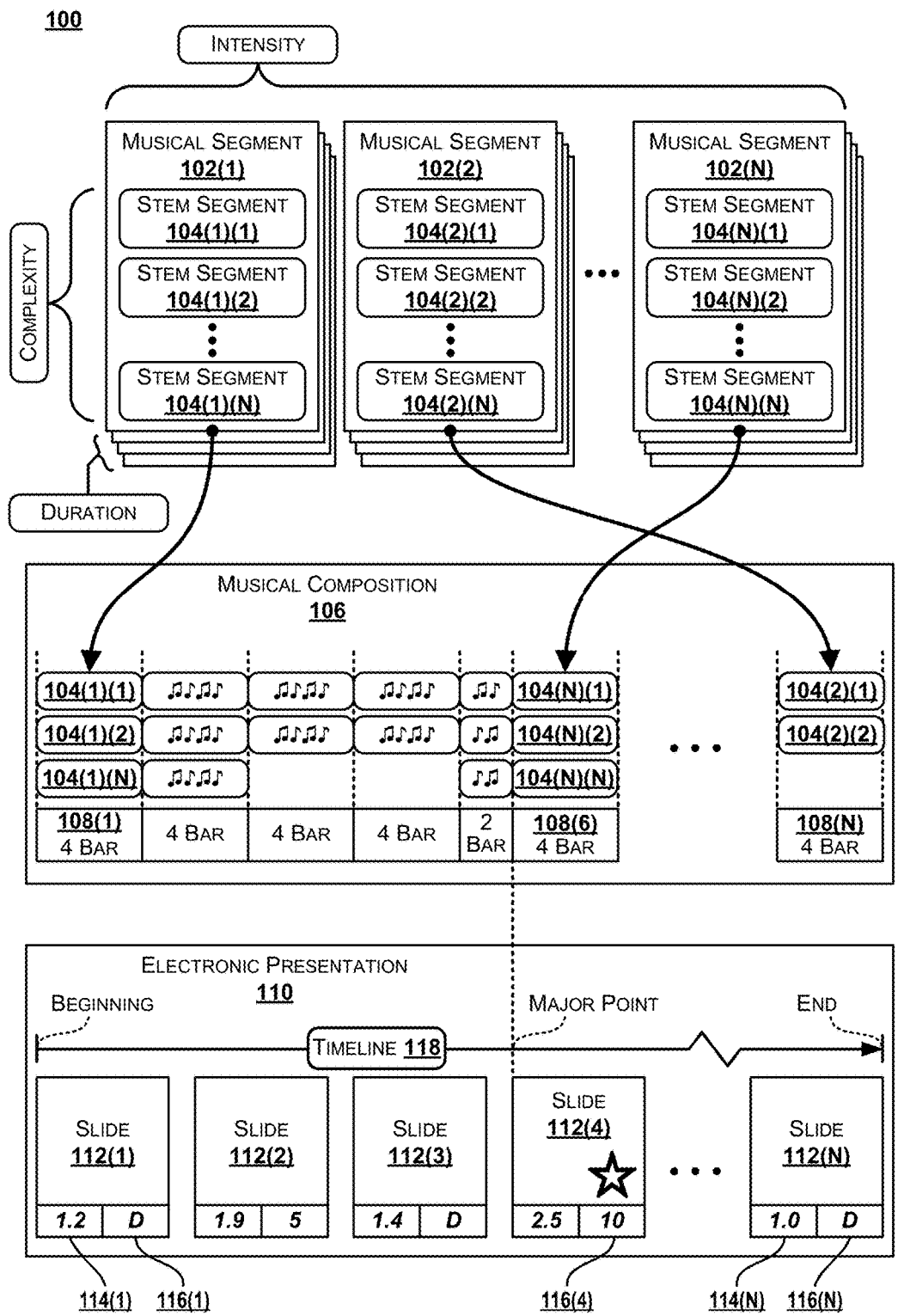
FIG. 1 is a schematic diagram that illustrates musical segments being arranged in accordance with corresponding intensity values to form a musical composition that is uniquely tailored to an electronic presentation.

The following Detailed Description describes systems and methods for arranging musical segments according to the importance of slides of electronic presentations to generate musical compositions that are unique to individual electronic presentations. Generally described, embodiments disclosed herein enable a user to select multiple images and to define an order in which to display the images during an electronic presentation. Embodiments further enable a user to indicate a level of importance for individual images. For example, the user may designate a specific image as a "highlight image" for emphasizing during the electronic presentation. Then, the system sets durations for individual composition slots by, for example, coarsely filling a total composition duration (e.g., a total running time for the electronic presentation) with multiple composition slots of a preferred length (e.g., four bars) and then filling in any gaps with relatively shorter composition slots. The system may also assign individual intensity levels to these composition slots based on the importance of various slides. In some implementations, the system may assign a highest intensity value to a particular composition slot that corresponds to a user defined "highlight" image and may assign decreasing intensity levels as the segments increase in distance from the "highlight" image. Thus, a musical composition may have a varying intensity that reaches a maximum level in association with the "highlight" image.

The techniques described herein enable a system to form a musical crescendo in association with the "highlight" slide of an electronic presentation. For example, the energy of the musical composition may gradually build up before maxing out at the "highlight" slide and then gradually decreasing as the electronic presentation comes to an end. It can be appreciated that since the musical composition is generated based on one or more quantifiable durations and levels of importance for the various slides of an electronic presentation, these techniques improve the usage of computing resources by reducing the processing cycles and memory that would be used in order to rearrange and iteratively set duration of slides for synchronization with one or more selected musical tracks.

In an exemplary implementation, a system receives presentation data that includes numerous user selected images and defines an order for presenting these images during an electronic presentation. For example, a user may deploy a presentation application to browse through folders and select the images for the electronic presentation. Exemplary presentation applications may include an image arrangement pane that displays the selected images in a manner that enables the user to re-arrange them into a desired order for presenting these images during an electronic presentation. The image arrangement pane may also enable the user to manually set durations to display one or more individual images. Exemplary presentation applications include, but are not limited to, GOOGLE'S PICASA and/or GOOGLE PHOTOS.

The system may further receive an input that designates an individual image as a "highlight" image for emphasizing during the electronic presentation. For example, the image arrangement pane may further enable the user to click on the individual image and then set an importance for this image. As a more specific but non-limiting example, the user may assign a numerical importance level such as "ten-out-of-ten" to the individual image and/or may place an importance indicator such as "star" on the individual image.

The system may further receive stem data that defines a collection of musical segments that can be ordered and/or stacked together to form unique musical compositions having discernable musical structure. The musical segments may be in the form of discrete musical loops of particular lengths (e.g., four bars, three bars, two bars, and/or one bar) that can be adjoined (e.g., end-to-end). Thus, although individual musical segments may be too short to reveal any discernable musical structure, adjoining multiple stems together may facilitate formation of a unique musical compositions that has a discernable musical structure with desirable qualities. As described in more detail elsewhere herein, the stem data may indicate intensity values for individual musical segments. The intensity values may generally represent an energy level (e.g., a pace and/or loudness) of the individual musical segments relative to other musical segments.

To generate a musical composition that is uniquely tailored to a particular electronic presentation, the system may determine individual durations for numerous composition slots. For example, the system may fill a total duration of the electronic presentation with numerous composition slots of predetermined lengths (e.g., four bars, three bars, two bars, and/or one bar) into which individual musical segments fit. The composition slots may be contiguously adjoined end-to-end to form segment boundaries at which the musical composition seamlessly progresses from one composition slot to another composition slot.

Individual intensity values may be assigned to the individual composition slots. The "assigned" intensity levels may be set by the system based on the presentation data and/or the user input that designate the "highlight" image.

For example, the system may assign a high intensity value to a composition slot that is set to occur while the "highlight" image is displayed. Then, the system may assign other intensity levels to adjacent composition slots so that the assigned intensity levels build up to a musical crescendo that coincides with the "highlight" image being displayed and then tapers off as the electronic presentation comes to an end.

The system may then generate the musical composition that is specifically tailored to the electronic presentation (e.g., by having the musical crescendo coincide with the display of the "highlight" image) by arranging the individual musical segments into the individual composition slots according to the assigned intensity values. For example, for each individual composition slot, the system may select a musical segment having an intensity value that matches the individual composition slot's "assigned" intensity value. Once arranged, the system may play individual musical segments according to the system generated arrangement while simultaneously progressing through the images of the electronic presentation.

In some embodiments, the system may display a genre-selection graphical user interface (GUI) that enables the user to select between various musical genres for the system to create the musical composition in accordance with. For example, the user may instruct the system to create a first unique musical composition for the electronic presentation based on a "classic rock" musical genre and a second unique musical composition for the same electronic presentation based on a "synth-pop" musical genre. In this way, the user can quickly and seamlessly experiment by testing out different the "feel" of numerous different musical genre for the same electronic presentation.

In some embodiments, the system may generate image progression data that indicates computer-defined durations for displaying the images during the electronic presentation. The computer-defined durations may be determined based on the musical composition and a number of image transition that will occur during the electronic presentation. For example, if there are a discernable number of images in the electronic presentation that each are shown a single time, then there are a discernable number of image transitions that will occur during the electronic presentation. Thus, the system may generate the musical composition that is coarsely aligned with the electronic presentation. Then, the system may fine-tune the electronic presentation to more closely align with the generated musical composition by autonomously adjusting the durations for displaying individual images. In various implementations, a user may be enabled to manually set durations for individual images by setting a user-defined duration for displaying a particular image during the electronic presentation. In some implementations, the system may update the image progression data to include any user-defined durations for displaying the particular images.

It can be appreciated that these techniques provide marked improvements over requiring a user to manually select tracks and then go through the laborious and computationally inefficient process of synchronizing the electronic presentation to the music. Thus, as described elsewhere in more detail, these techniques improve the usage of computing resources by reducing the processing cycles and memory used to synchronize music to the slides of an electronic presentation. In some instances, the system may respond to a user selection of a particular musical genre by requesting corresponding stem data to use for generating a musical composition in accordance with this genre. Furthermore, the system may monitor user activity to identify a user gesture that triggers a sampling of a particular genre. For example, a user might "hover" a mouse curser over the button associated with the "synth-pop" musical genre to cause the system to play a sample of the "synth-pop" musical genre aloud to the user. In this way, a user can quickly sample numerous musical genres to hone in on a most appropriate musical genre for their particular needs. It can be appreciated, therefore, that the foregoing techniques also reduce network bandwidth and/or processing cycles since in many cases they can mitigate the need for users to download numerous entire tracks for numerous different musical genres.

The disclosed techniques are believed to be applicable to a variety of computing scenarios in which an electronic presentation (e.g., a slide-based presentation, a photo-based presentation, a video-based presentation, etc.) is associated with various characteristics that can be computationally weighed to generate musical compositions that are unique to individual electronic presentations. Aspects of the techniques disclosed below are described in the context of a "slide-based" electronic presentation that includes at least one slide that varies in importance from other slides. While the scope of the disclosed techniques is not necessarily limited to "slide-based" electronic presentations, an appreciation of various aspects of the disclosed techniques is readily gained through a discussion of examples that are described with respect to this specific type of electronic presentation. Various aspects of the disclosed techniques are, however, widely applicable to other electronic presentation types such as, for example, "video-based" presentations. For example, the techniques herein may be deployed to enable a user to indicate one or more portions of a "video-based" presentation that is of higher importance than other portions of the "video-based" presentation. Then, the techniques described herein may be deployed by a system to automatically generate a musical composition that is unique to the "video-based" presentation and that increases and/or decreases in intensity and/or complexity based on the importance of certain portions. In some examples, the computing system described herein may be configured to analyze an electronic presentation and determine one or more characteristics of the electronic presentation automatically (e.g., without manual user input defining the one or more characteristics). For example, the techniques described herein may enable a computing system to analyze a "video-based" electronic presentation to determine an intensity level (e.g., a level of action and/or motion and/or emotional facial expressions, etc.) of the "video-based" presentation at various times (e.g., for various portions of the electronic presentation). Then, the techniques described herein may be deployed to generate a unique musical composition that varies in intensity and/or complexity based on the characteristics that were automatically identified for the electronic presentation.

Turning now to FIG. 1, a schematic diagram 100 illustrates musical segments 102 being arranged in accordance with corresponding intensity values to form a musical composition 106 that is uniquely tailored to an electronic presentation 110. For example, an intensity (e.g., perceived energy) of the musical composition 106 may vary to dynamically match an importance of multiple slides 112 of the electronic presentation 110. The musical segments 102 may vary in accordance with one or more dimensions (e.g., measurable extents of some kind). In the illustrated example, the musical segments 102 vary in accordance with three different dimensions that include intensity, complexity, and duration.

Referring specifically to the "intensity" dimension, the musical segments 102 are shown to vary from a first intensity level that corresponds to a first musical segment 102(1) up to an $N^{th}$ intensity level that corresponds to an $N^{th}$ musical segment 102(N). For purposes of the present discussion, the $N^{th}$ intensity level is the highest intensity level for the musical segments 102. In some implementations, the intensity level of a particular musical segment 102 may indicate a relative note structure density as compared to other musical segments 102. For example, the $N^{th}$ musical segment 102(N) may have the highest tempo or rhythmic pace as compared to the other musical segments 102. Thus, the pace of the musical composition 106 may increase or decrease as the intensity level of musical segments 102 that are currently being played increases or decreases, respectively. Additionally, or alternatively, in some implementations, the intensity level of a particular musical segment 102 may indicate a relative volume as compared to other musical segments 102. For example, the $N^{th}$ musical segment 102(N) may have the highest volume as compared to the other musical segments 102. The musical segments 102 may be in the form of discrete musical pieces of particular lengths (e.g., four bars, three bars, two bars, and/or one bar) that can be adjoined (e.g., end-to-end).

As used herein, the term "intensity" may refer generally to a measurable extent of one or more musical properties such as, for example, tempo (e.g., of a beat), intervals, pitch, dynamics (e.g., loudness or softness), and/or any other suitable musical property that is suitable for controlled and incremental modification across musical segments as described herein. For example, the musical properties of tempo and dynamics may be incrementally controlled across numerous musical segments to manage the perceived energy level of individual musical segments.

Referring specifically to the "complexity" dimension, individual ones of the musical segments 102 are shown to include N discrete stem segments 104 so that the complexity at which any particular musical segment 102 is played can vary from a first complexity level to an $N^{th}$ complexity level. With particular reference to the first musical segment 102 (1), illustrated are N discrete stem segments 104 that each correspond to the first intensity level. Thus, in addition to varying the intensity of various composition slots 108 (each labeled with a corresponding duration, e.g., four bar), the complexity of the various composition slots 108 may also be varied.

In some implementations, the complexity level assigned to any particular composition slot 108 indicates how many individual stem segments 104 are played during that particular composition slot 108. Stem segments 104 may be played individually and/or concurrently during a particular composition slot 108 depending on a complexity level that is assigned to that particular composition slot 108. Thus, if a complexity level for the particular composition slot 108 is relatively higher than another composition slot 108, then a greater number of stem segments 104 may be concurrently played during the particular composition slot 108 as compared to the other composition slot 108. Exemplary stem segments 104 include, but are not limited to, drum stems, bass stems, harmony stems, and/or melody stems.

For purposes of notation, the intensity level of any particular musical segment 102 is indicated by an integer included within a parenthetical (where applicable). For example, the intensity level of the first musical segment 102(1) is one ("1") whereas the intensity level of the N$^{th}$ musical segment 102(N) is "N." For purposes of the present discussion, the N$^{th}$ complexity level is the highest complexity level at which the musical segments 102 can be played.

Furthermore, where applicable, the intensity level of any particular stem segment 104 is indicated by an integer included within a first (e.g., leftmost) parenthetical and the complexity value of any particular stem segment 102 is indicated by an integer included within a second (e.g., rightmost) parenthetical. For example, for stem segment 104(1)(2) the intensity level is one ("1") and the complexity value is two ("2"). For the purpose of reducing the visual complexity of the figures, numerous ones of the stem segments 104 that are shown as having been allocated into the musical composition 106 are labelled graphically only with a sequence of generic musical note symbols (i.e., "♫♪♫♪ ").

Referring specifically to the "duration" dimension, individual ones of the musical segments 102 are shown to include N versions (illustrated as being layered into the page) that are each designed to play for a different predefined length of time. For purposes of the present discussion, each musical segment 102 of a particular intensity level comprises a one bar (or duration/measure of time) version at that particular intensity level, a two-bar version at that particular intensity level, a three-bar version at that particular intensity level, and a four-bar version at that particular intensity level. Furthermore, the different length versions of each musical segment 102 may comprise N discrete stem segments 104 of a corresponding length. For example, the two-bar version of the first musical segment 102(1) may comprise N discrete stem segments 104 that are two bars in length and that are similar sounding to, but shorter than the N discrete segments of the three-bar or four-bar versions of the first musical segment 102(1).

As illustrated, an exemplary electronic presentation 110 may include a plurality of slides 112 that are to be successively shown in a predefined order. In some implementations, each slide 112 may correspond to a user selected image (e.g., a .jpg file). The slides 112 may be arranged according to a user defined order for presenting (e.g., causing display of) the user selected images.

As illustrated, the electronic presentation 110 is shown in the form of an image arrangement pane that displays the selected images in a manner that enables the user to rearrange them into a desired order for presentation. For example, in FIG. 1 the slides 112 are arranged such that the first slide 112(1) is presented first, the second slide is presented second, and so on until the electronic presentation 110 ends after the N$^{th}$ slide is presented. If the user wishes for the second slide 112(2) to be presented first and for the first slide 112(1) to be presented second, the user can re-order these slides within the illustrated image arrangement pane (e.g., by dragging the first slide 112(1) to the right of the second slide 112(2)).

The electronic presentation 110 may define durations 114 for presenting the slides 112. In the illustrated example, a first duration 114(1) of one-point-two ("1.2") seconds has been defined for the first slide 112(1), an N$^{th}$ duration 114(N) of one ("1.0") second has been defined for the N$^{th}$ slide 112(N), and so on. An aggregate amount of the durations 114 may define a total running time for a timeline 118 of the electronic presentation 110.

In some implementations, one or more of the durations 114 may be automatically set by a presentation application. For example, the user may define the total running time of the timeline 118 and the presentation application may apportion each slide 112 an equal duration. As another example, the presentation application may assign a default duration of, for example, two-point-five ("2.5") seconds to each slide 112, and the presentation application may set the total running time of the timeline 118 based on how many slides 112 are included within the electronic presentation 110. In various embodiments, the presentation application may enable the user to manually set a duration 114 for one or more of the slides 112 and the manually-set durations may override any default durations generated by the presentation application.

In various implementations, the electronic presentation 110 may define an importance 116 (e.g., a ranking) of one or more slides 112 with respect to other ones of the slides 112. For example, a user input may designate an individual slide 112 as a "highlight" slide for emphasizing during the electronic presentation 110. In the illustrated example, the fourth slide 112(4) has been assigned an importance level of "ten-out-of-ten" and the second slide 112(2) has been assigned an importance level of "five-out-of-ten." Furthermore, the fourth slide 112(4) is also shown in association with a graphical important indicator (e.g., in the form of a star). In some implementations, one or more slides 112 may be designated with a default importance 116. In the illustrated, example, each of the first slide 112(1), the third slide 112(3), and the N$^{th}$ slide 112(N) are shown in association with a "D" indicating that they are attributed a default importance 116.

Due to the fourth slide 112(4) being assigned the highest importance of all the slides, the beginning of the fourth slide 112(4) on the timeline 118 is marked as a "major point" that the musical composition 106 is to be designed to emphasize (e.g., by playing relatively higher intensity music during this slide as compared to other slides). In the illustrated example, the musical composition 106 includes a sixth composition slot 108(6) that begins at an instance corresponding to the major point and that includes stem segments 104 taken from the N$^{th}$ musical segment 102(N) which corresponds to the highest intensity level of all the musical segments 102.

The musical composition 106 further includes a first composition slot 108(1) that starts at the beginning of the electronic presentation 110 and an N$^{th}$ composition slot 108(N) that finishes at the end of the electronic presentation 110. In the illustrated example, the first composition slot 108(1) includes stem segments 104 taken from the first musical segment 102(1) and the N$^{th}$ composition slot 108(N) includes stem segments 104 taken from the second musical segment 102(2). The intensity levels assigned to successive composition slots 108 may gradually decrease as the composition slots 108 become farther from whichever composition slot has the highest intensity level and is played in association with the "highlight" image. Thus, the musical composition 106 may be designed to have a musical crescendo that is played in association with the "highlight" image in order to emphasize (e.g., draw viewers' attention to) the "highlight" image.

Turning now to FIG. 2, illustrated is an exemplary musical segment 102 that includes multiple stem segments 104 of a particular intensity level and duration. As illustrated, the exemplary musical segment 102 corresponds to an intensity level of one ("1") and, thus, is labeled as musical segment 102(1) to maintain consistent notation with FIG. 1. As further illustrated, the exemplary musical segment 102 corresponds to a duration of four bars (e.g., musical measures).

In some implementations, the intensity level of a particular musical segment 102 may indicate a relative note structure density of the stem segments 104 that are included within that particular musical segment 102 as compared to other stem segments 104 of other musical segments 102. In the illustrated example, the musical segment 102(1) corresponding to the intensity level of one indicates that the tempo (e.g., nominal beats-per-minute) of the stem segments 104 included within the musical segment 102(1) is designed as one hundred and twenty ("120").

In some implementations, the intensity level of a particular musical segment 102 may indicate a relative volume of the stem segments 104 that are included within that particular musical segment 102 as compared to other stem segments 104 of other musical segments 102. In the illustrated example, the musical segment 102(1) corresponding to the intensity level of one indicates that the relative volume (e.g., decibel level) of the stem segments 104 included within the musical segment 102(1) is designed to be fifteen percent ("15%") of a "highest intensity" musical segment 102(N).

As illustrated, the exemplary musical segment 102(1) includes four stem segments 104 that each correspond to a particular musical type 202. More specifically, the exemplary musical segment 102(1) includes a first stem segment 104(1)(1) this is a four-bar measure of a first musical type 202(1) such as drums, a second stem segment 104(1)(2) this is a four-bar measure of a second musical type 202(2) such as bass, and so on. As indicated by the first (e.g., leftmost) parenthetical in the labeling of the illustrated stem segments 104, each illustrated stem segment 102 is designed at the intensity level of one.

As further illustrated, individual stem segments 104 are designated with a corresponding complexity array 204 that indicates one or more complexity level values at which the individual stem segments 104 are to be played. For example, under circumstances in which a particular composition slot 108 is assigned the exemplary musical segment 102(1) and is further assigned a complexity level of one ("1"), the only stem segment 104 that will be played during the particular composition slot 108 will be the first stem segment 104(1) (1). The reason for this is that in the illustrated example, only the first stem segment 104(1)(1) is associated with a complexity array 204 that includes the complexity level of one ("1").

If, in contrast, the particular composition slot 108 were to be assigned a complexity level of two ("2"), then both of the first stem segment 104(1)(1) and the second stem segment 104(1)(2) would be played concurrently during the particular composition slot 108. In some implementations the foregoing pattern continues so that if a composition slot 108 is assigned a complexity level of N, then all of a first stem segment 104(1) through an $N^{th}$ stem segment 104(N) will be concurrently played during that composition slot 108.

In some implementations, the systems and techniques described herein are configured to cause adjacent composition slots 108 to vary in terms of at least one of intensity or complexity. For example, consider a scenario in which the musical segments 102 vary based on seven discrete intensity levels and in which a musical composition 106 includes fifty discrete composition slots 108. Further suppose that the musical composition 106 is designed to gradually increase in intensity from a beginning up to a maximum intensity of seven at the twenty-fifth composition slot 108. In this scenario, two adjacent composition slots 108 may be assigned the same intensity level and, therefore, the complexity levels assigned to these two adjacent composition slots 108 may be varied. Varying the complexity levels that are assigned to adjacent composition slots 108 of the same intensity level may assist in generating an audibly pleasing musical composition that does not sound obviously repetitive to listeners.

Figure 3:
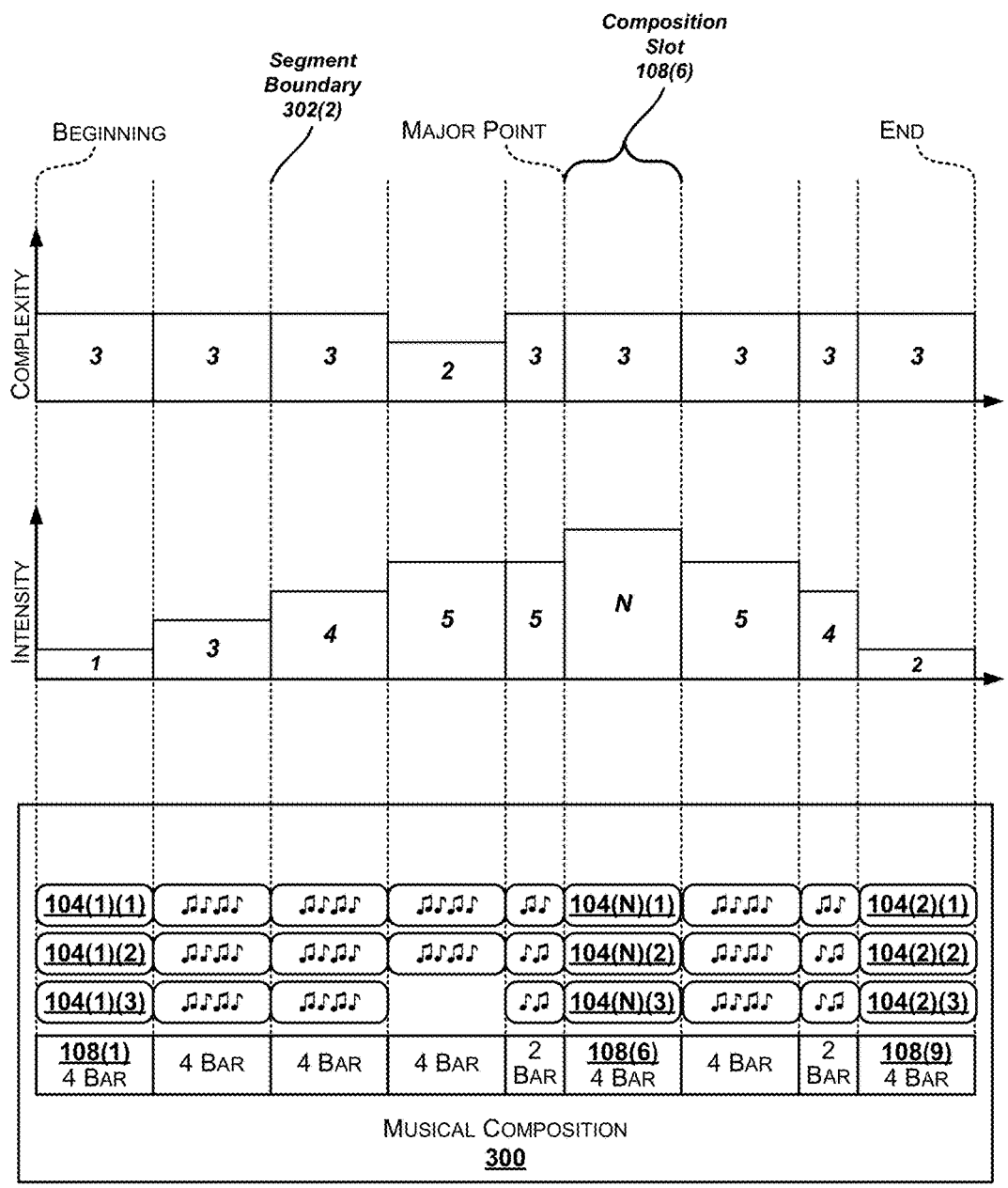
FIG. 3 illustrates an exemplary musical composition that includes a plurality of composition slots that vary in terms of an intensity dimension and a complexity dimension.

Turning now to FIG. 3, illustrated is an exemplary musical composition 300 that includes a plurality of composition slots 108 that vary in terms of an intensity dimension and a complexity dimension. In particular, the exemplary musical composition 300 includes nine discrete composition slots 108 that are contiguously adjoined end-to-end to form segment boundaries 302 at which the exemplary musical composition 300 seamlessly progresses from one composition slot 108 to another composition slot 108.

In some implementations, the stem segments 104 that make up the musical segments 102 are digital data that is in the formatted in accordance with a compressed and/or uncompressed an audio coding format. For example, each stem segment 104 may be a digital data in the form of a container that includes raw audio data that is encoded according to a codec that corresponds to the corresponding musical segment 102 and/or the stem data as a whole. Accordingly, processing the stem segments 104 and/or musical segments 102 to generate the musical composition may include adjoining multiple pieces of raw audio data to form a length of raw audio data that corresponds to a duration of a timeline of an electronic presentation and, then, decoding the adjoined pieced of raw audio data in accordance with a single codec that corresponds to the stem data from which the individual stem segments 104 have been selected and arranged. Thus, unlike conventional audio file formatting and storage techniques include a codec for each piece of raw audio data, various implementations of the disclosed techniques reduce the processing cycles requires to switch between codecs for decoding raw audio data during playback and also reduce storage requirements since rather than redundantly storing multiple codecs for each instance of raw audio data, a single coded may be shared across numerous instances of raw audio data.

In some implementations, the musical composition 300 may be in the form of metadata that defines an arrangement of the musical segments 102 and/or stem segments 104 (and/or transitions 402 as described elsewhere herein) with respect to one another. For example, in these situations, audibly playing the musical composition may include analyzing the musical composition 300 to access appropriate portions of stem data (e.g., individual stem segments 104) in real time to play these portions in accordance with an appropriate order and timing to audibly form the musical composition.

As shown in FIG. 3, the exemplary musical composition 300 is illustrated in temporal alignment with an intensity graph that indicates an intensity level that is assigned to each individual composition slot 108. Each discreet portion of the intensity graph indicates an intensity level assigned to a corresponding composition slot 108 (e.g., the sixth composition slot 106(N) has an intensity level of N). Here, the exemplary musical composition 300 is shown to include a major point that corresponds to a fifth segment boundary (i.e., a boundary between the fifth composition slot 108(5) and the sixth composition slot 108(6)). In the illustrated example, therefore, the sixth composition slot 108(6) is assigned the $N^{th}$ musical segment 102(N) that has the highest intensity of all the other musical segments 102. As graphically represented by the intensity graph, the intensity levels of the other composition slots 108 gradually decrease as the distance from the highest intensity composition slot 108(6) increases.

In some implementations, the musical segments 102 may include an "intro" musical segment that is designed to serve as an opening section of the musical composition(s) and/or an "outro" musical segment that is designed to serve as a terminal section of the musical composition(s). An exemplary "intro" musical segment may be designed to fade-in music whereas an exemplary "outro" musical segment may be designed to fade-out music. For purposes of the discussion of FIG. 3, assume that the first musical segment 102(1) is designed to serve as an "intro" and that the second musical segment 102(2) is designed to serve as an "outro." Accordingly, in the illustrated scenario, the first musical segment 102(1) is assigned to the first composition slot 108(1) and the second musical segment 102(2) is assigned to the ninth composition slot 108(9).

As further shown in FIG. 3, the exemplary musical composition 300 is also illustrated in temporal alignment with a complexity graph that indicates a complexity level assigned to each individual composition slot 108. Each discreet portion of the complexity graph indicates a complexity level that is assigned to a corresponding composition slot 108 (e.g., the sixth composition slot 106(N) has a complexity level of 3). Here, the exemplary musical composition 300 is shown to include eight composition slots that are assigned a complexity level of three and a single composition slot that is assigned a complexity level of two. As described above, the complexity level for any particular composition slot 108 may indicate how many individual stem segments 104 are played during that particular composition slot 108. As a specific but nonlimiting example, a composition slot 108 being assigned a complexity level of three may indicate that three discrete stem segments 104 are to be concurrently played during this composition slot 108.

As described above, adjacent composition slots 108 may be deliberately varied in terms of at least one of intensity or complexity. Furthermore, in some implementations, the individual composition slots 108 may be assigned according to a default complexity level. For illustrative purposes regarding FIG. 3, suppose that the individual musical segments 102 each comprise three corresponding stem segments 104. For example, the first musical segment 102(1) that corresponds to the first intensity level includes stem segments 104(1)(1), 104(1)(2), and 104(1)(3). Further suppose that individual composition slots 108 are by default assigned a complexity level of three so that all three stem segments 104 of whichever musical segment 102 is assigned to the individual composition slots 108 will be concurrently played.

However, if two adjacent composition slots 108 are assigned the same intensity value, then the complexity levels of these two adjacent composition slots 108 may be deliberately varied. For example, with particular reference to the fourth composition slot 108(4) and the fifth composition slot 108(5) of FIG. 3, it can be seen that each of these two composition slots are adjacent and assigned the same intensity level of five. Thus, responsive to this circumstance, one of these two composition slots may be assigned a complexity level other than the default complexity level of three. In the illustrated example, the fourth composition slot 108(4) is assigned a complexity level of two which results in the third stem segment 104 being "dropped" out of whichever musical segment 102 is assigned to the fourth composition slot 108(4). Varying the complexity levels that are assigned to adjacent composition slots 108 of the same intensity level may assist in generating an audibly pleasing musical composition that does not sound obviously repetitive to listeners. Moreover, varying the complexity of the different composition slots 108 reduces the overall digital footprint required to store the output musical composition since dropping stem segments out of individual composition slots reduces the amount of raw audio data that goes into generating the output musical composition.

Figure 4:
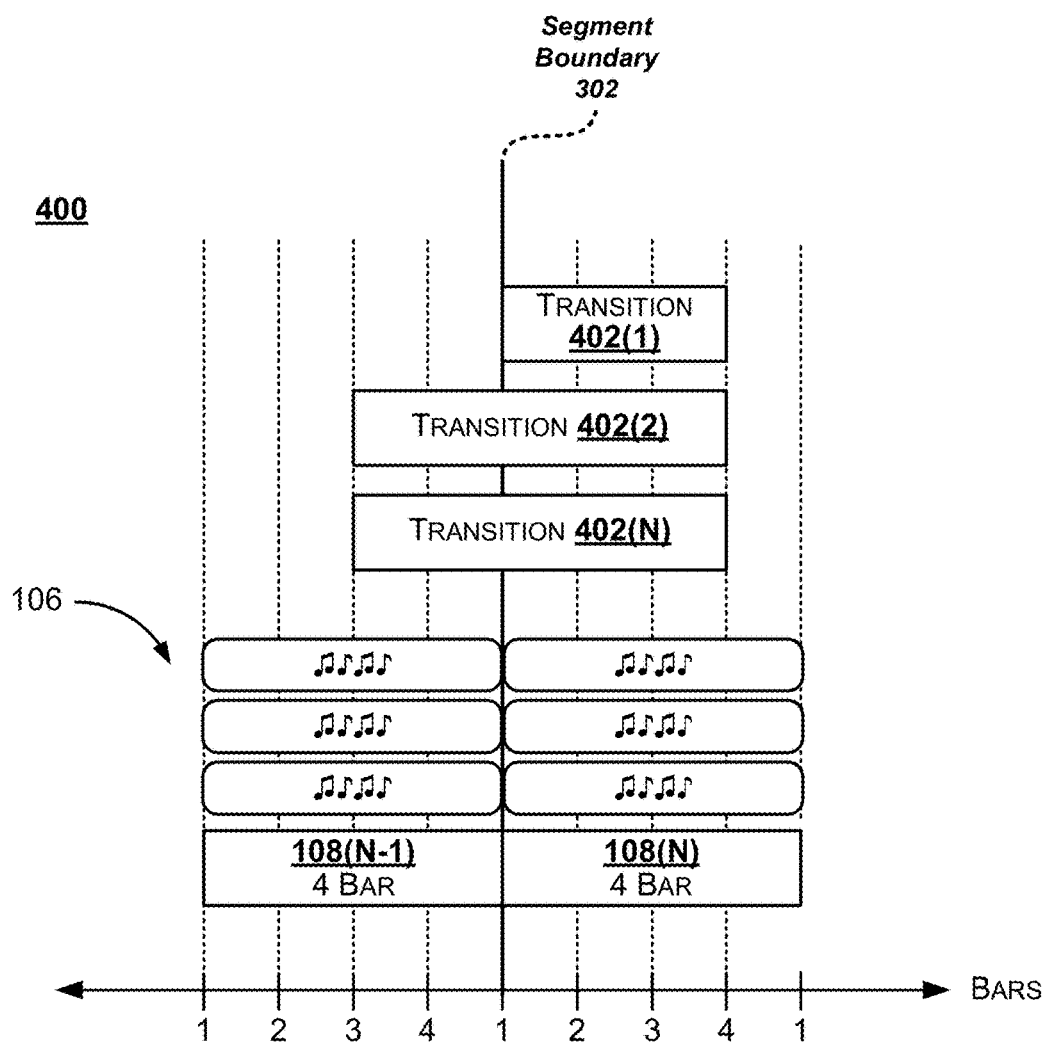
FIG. 4 is a schematic diagram that illustrates a plurality of transitions that are designed to be added to a musical composition in relation to a downbeat.

Turning now to FIG. 4, a schematic diagram 400 illustrates a plurality of transitions 402 that are designed to be added to a musical composition 106 in relation to a downbeat 404. As illustrated, the plurality of transitions includes a first transition 402(1) through an $N^{th}$ transition 402(N).

In various embodiments, one or more of the transitions 402 may be added to the musical composition 106 to mask any audibly perceivable imperfections in the mating between the stem segments 104 that are played in two adjacent composition slots. For example, in certain instances, the terminal portion of a particular stem segment might not blend well with a beginning portion of another stem segment that is played immediately subsequent to the particular stem segment within a particular musical composition 106. Exemplary transition types include, but are not limited to, cymbal-based transitions, drum fill-based transitions, and/or musical swell-based transitions (e.g., FX-based transitions).

In some implementations, one or more transitions 402 may be designed to begin precisely at a segment boundary 302 between two composition slots 108. Stated alternatively, a transition 402 may be initiated right at the downbeat of a particular measure of a musical composition 106. As a specific but non-limiting example, a particular transition 402 may be a "cymbal crash" transition 402(1) that occurs right on the one as illustrated in the schematic diagram 400.

In some implementations, one or more transitions 402 may be designed to begin prior to a segment boundary 302 for masking any imperfections at that segment boundary 302. For example, a particular transition 402 may be designed to cause a drum fill to occur two-bars prior to segment boundary 302. In some implementations, a particular transition 402 may begin prior to the segment boundary 302 and then resolve at the segment boundary 302 and then finally play a "tail" for a particular number of measures after the segment boundary 302. As a specific but non-limiting example, a particular transition 402 may be a "drum fill" transition 402(1) that begins two-bars before and then resolves at a segment boundary 402 before reverberating for three-bars after the segment boundary 302.

In some implementations, the plurality of transitions 402 may include multiple different versions of any particular type of transition. For example, the plurality of transitions 402 may include three versions of drum fill transitions, three versions of cymbal crash transitions, and/or three versions of swell transitions. The multiple different versions of transitions 402 may be combined in various ways based on factors such as, for example, a musical genre that the musical composition 106 corresponds to (e.g., an "electronic music genre may result in a high use of a reverse-cymbal type transition).

In some implementations, aspects of the "complexity" dimension discussed with respect to the stem segments 104 may also be applicable to adding the transitions 402 to a musical composition 106. For example, the number of individual transitions 402 that are added with respect to any particular segment boundary 302 may be varied based on an intensity level of the composition slots 108 that form that particular segment boundary 302. In some implementations, the number of transitions 402 that are added at any particular segment boundary 302 is positively correlated with the intensity level(s) for the stem segments 104 that touch that particular segment boundary 302. In one specific but non-limiting example, the number of transitions 402 that are to be applied at a segment boundary 302 may be determined based on the intensity level(s) of the stem segments 104 touching that segment boundary 302 and, then, the versions of the transitions 402 are added may be chosen at random.

Figure 5:
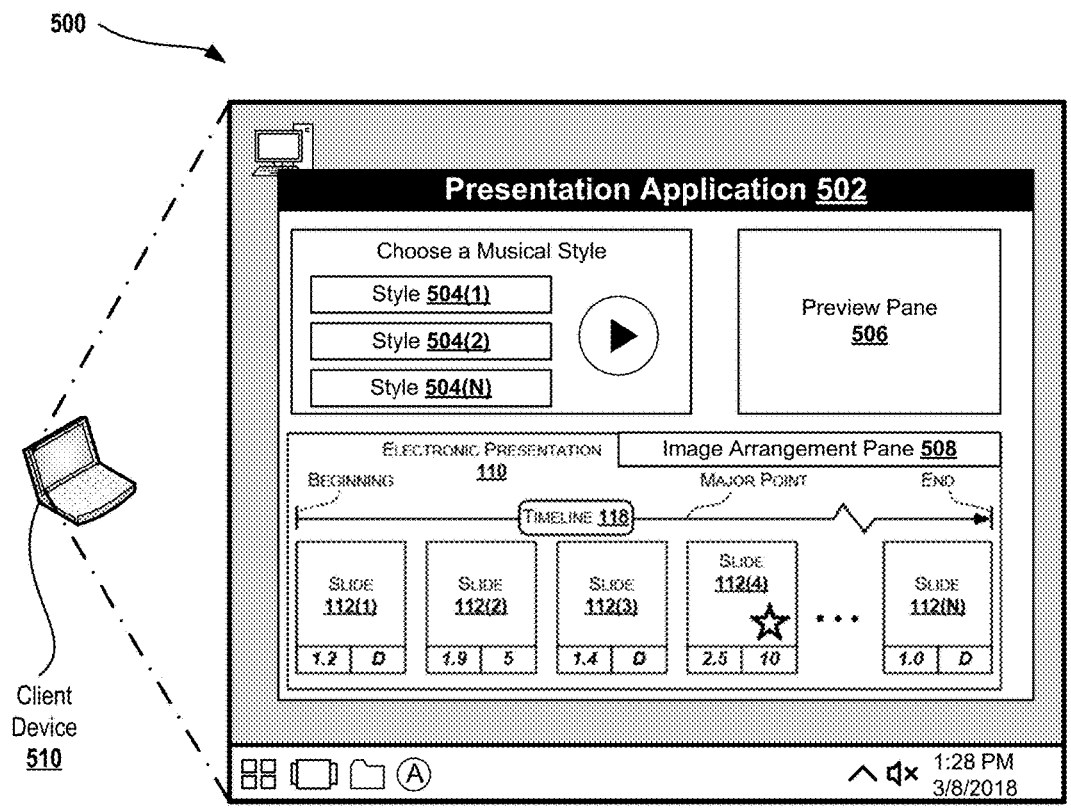
FIG. 5 illustrates an exemplary genre-selection graphical user interface (GUI) that enables selection between a plurality of different musical styles (e.g., genres) for causing a presentation application to generate a musical composition that is both unique to a particular electronic presentation and a selected musical style.

Turning now to FIG. 5, illustrated is an exemplary genre-selection graphical user interface (GUI) 500 that enables selection between a plurality of different musical styles 504 (e.g., genres) for causing a presentation application 502 to generate a musical composition 106 that is both unique to a particular electronic presentation 110 and a selected musical style.

As illustrated, a client device 510 may display the genre-selection GUI 500 in association with a presentation application 502. In some embodiments, the presentation application 502 may cause display of an image arrangement pane 508 that enables a user to arrange the slides 112 in a preferred order and/or to assigned durations 114 and/or levels of importance 116 to one or more individual slides.

In some implementations, after arranging the slides 112 and/or assigning durations 114 and/or levels of importance 116 as desired, the user may select a particular style 504 and then select a "preview" button (e.g., user interface element) to cause the presentation application 502 to play a sample of the selected style 504. For example, the user might select an "electronic-rock" musical genre and then select the preview button to listen to a snippet of the "electronic-rock" stem segments 104. If the user is not pleased with the "electronic-rock" musical genre sample, then a different style 504 can be selected and previewed.

In some implementations, "previewing" a particular musical style 504 may cause the presentation application 502 to display the electronic presentation 118 graphically within the preview pane 506 while simultaneously playing a musical composition (e.g., audibly playing through a speaker of the client device 510) that is uniquely created for the electronic presentation 110 using musical segments 102 and corresponding stem segments 104 of the selected musical type 504.

In some implementations, the presentation application 502 may monitor user-input activity that corresponds to the genre-selection GUI 500 to identify an input-gesture in association with a particular musical style (e.g., genre). For example, the presentation application 502 may determine that a user is hovering a mouse curser over (e.g., without clicking) a particular musical genre. Then, responsive to an identified input gesture, the presentation application 502 may cause an audio output-device (e.g., a speaker, a headphone, etc.) to play an audio sample of the particular musical genre. In some cases, the sample may be played without displaying the electronic presentation 110 within the preview pane 506.

It can be appreciated the unique and novel arrangement of the various user interface elements of FIG. 5 such as, for example, the "Style-Selection" buttons (i.e., user interface elements) 504(1) through 504(N) further reduce processing cycles associated with sampling various musical genres in association with a "work-in-progress" (e.g., currently open) electronic presentation. For example, rather than requiring a user to manually navigate through various folders and/or download multiple full size musical tracks, the genre-selection GUI 500 enables sampling of a particular musical genre with approximately only those processing cycles required to audibly play raw audio data—not ancillary processing cycles that would be triggered by manually navigating through a file directory structure to individually locate a digital audio file corresponding to a musical genre of interest.

Figure 6:
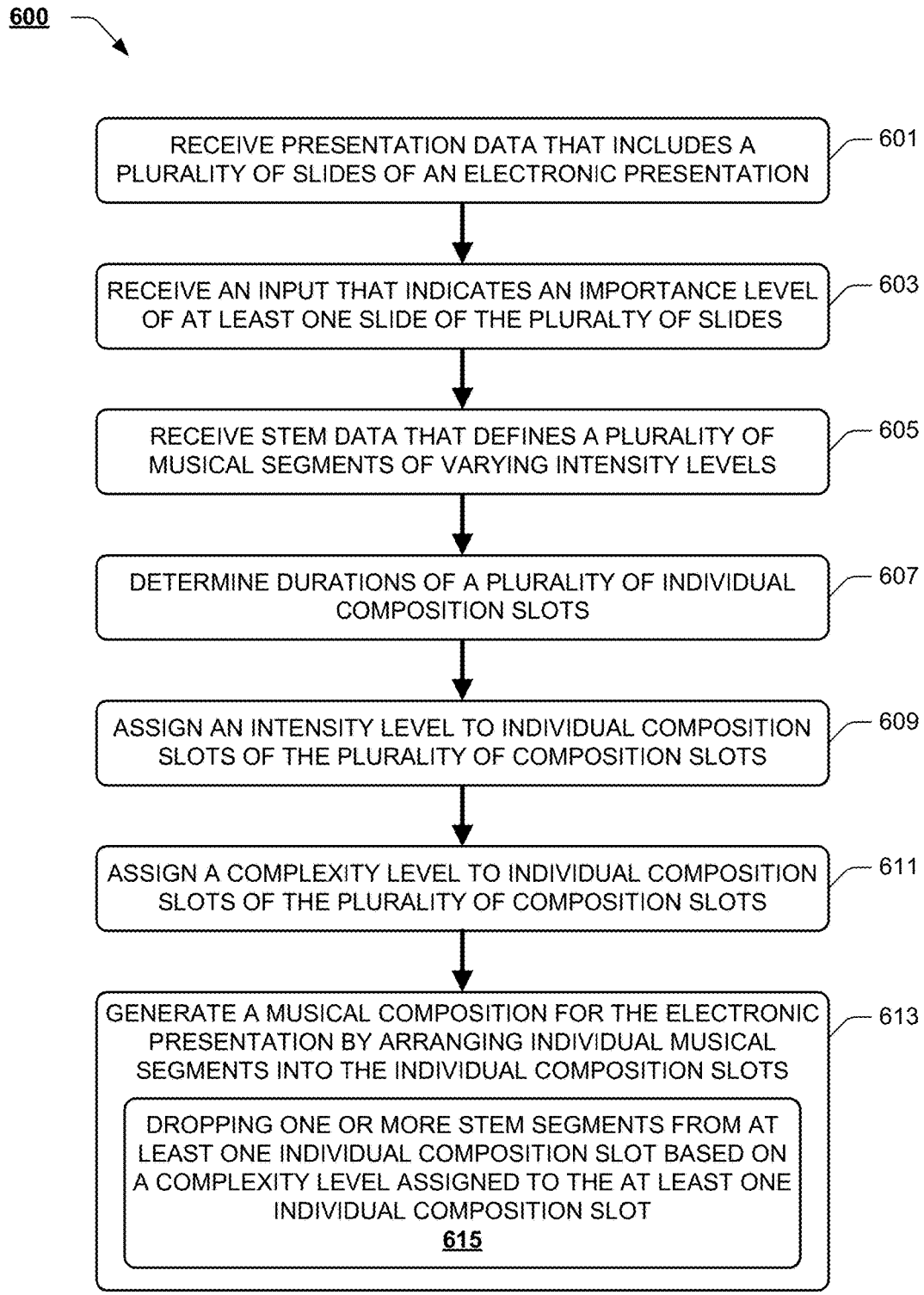
FIG. 6 illustrates a flow diagram of an example method for generating a musical composition that is uniquely tailored to an electronic presentation by arranging musical segments in accordance with various characteristics of the electronic presentation.

FIG. 6 illustrates an example flow diagram. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-executable instructions included on a computer-storage media, as defined herein. The term "computer-executable instructions," and variants thereof, as used in the description and claims, is used expansively herein to include routines, applications, application modules, program modules, programs, components, data structures, algorithms, and the like. Computer-executable instructions can be implemented on various system configurations, including single-processor or multiprocessor systems, minicomputers, mainframe computers, personal computers, hand-held computing devices, microprocessor-based, programmable consumer electronics, combinations thereof, and the like.

Turning now to FIG. 6, illustrated is a flow diagram of an example method 600 for generating a musical composition 106 that is uniquely tailored to an electronic presentation 110 by arranging musical segments 102 in accordance with various characteristics of the electronic presentation 110.

At block 601, a computing system, such as that described below in detail with regard to FIG. 7, receives presentation data that includes a plurality of slides of an electronic presentation 110. The presentation data may include order data that defines an order for presenting the slides and/or duration data that defines durations for displaying each individual slide. For example, as illustrated in association with the image arrangement pane 508 of FIG. 5, the slides 112 may be displayed from left-to-right in whichever order they are to be presented and the user may re-arrange the "left-to-right" order as displayed to manage the order for presenting the slides when the electronic presentation is actually shown (e.g., in presentation mode).

At block 603, the computing system may receive an input that indicates an importance level of one or more individual slides with respect to one or more other individual slides. For example, the input that is received may designate an individual image as a highlight image by assigning the individual image an importance level of "ten-out-of-ten." In some instances, the user may designate individual importance levels with respect to numerous individual slides. For example, under circumstances in which the electronic presentation includes one-hundred different slides, the user may designate a seventy-fifth slide 112(75) with an importance level of "ten-out-of-ten" and a fiftieth slide 112(50) with an importance level of "nine-out-of-ten." In this example, the other slides may be assigned a default level of importance of "one-out-of-ten."

At block 605, the computing system may receive stem data that defines a plurality of musical segments 102 for adjoining at a plurality of segment boundaries 302 to form the musical composition 106. The stem data may indicate intensity values for individual musical segments 102. For example, as described in relation to FIG. 1, the musical segments 102 may vary in accordance with an "intensity" dimension such that a "tempo" or "volume" of the different musical segments varies proportionally with the intensity level.

At block 607, the computing system may determine durations for a plurality of composition slots 108 that are contiguously placed and, therefore, define the segment boundaries 302. In some instances, determining the durations includes filling a total duration of the musical composition with composition slots of a default and/or preferred duration such as, for example, four-bars. For example, the computing system may first assign a four-bar composition slot to begin at any identified "major point" that is identified based on the importance levels. For example, in the example where the user designated the seventy-fifth slide 112(75) with an importance level of "ten-out-of-ten" and the fiftieth slide 112(50) with an importance level of "nine-out-of-ten," the computing system may first place four-bar composition slots 108 to align with the seventy-fifth slide 112(75) and the fiftieth slide 112(50). Then, the computing system may fill in as many other preferred length composition slots 108 as appropriate before filling any resulting "gaps" with shorter segments as appropriate.

At block 607, the computing system may assign intensity levels to the individual composition slots. This may include first assigning an $N^{th}$ intensity level (e.g. a highest intensity level) to whichever slide is ranked as the most important and then assigning an intensity level of "N−1" to the next most important slide. For example, continuing with the example where the seventy-fifth slide 112(75) is marked "ten-out-of-ten" and the fiftieth slide 112(50) is marked "nine-out-of-ten," if N is equal to seven the computing system may assign an intensity level of seven to the seventy-fifth slide 112(75) and an intensity level of six to the fiftieth slide 112(50). Then, the computing system may assign intensity levels to the first and last composition slots. For example, in instances in which the musical segments include an intro stem and an output stem, these stems may be assigned to the first and last composition slots, respectively. As described above, the computing system may then assign other complexity levels to the remaining composition slots such that the intensity of the resulting musical composition gradually builds up to and away from the most important slides of the electronic presentation 110.

At block 611, the computing system may assign complexity levels to the individual composition slots. In some implementations, the computing system may assign a default complexity level to each individual composition slot and adjust the complexity levels where appropriate to ensure that adjacent composition slots vary in terms of at least one of complexity or intensity.

At block 613, the computing system may generate the musical composition for the electronic presentation 110 by arranging individual musical segments into the individual composition slots in accordance with the assigned intensity levels and/or complexity levels. For example, for any individual composition slot that is assigned an intensity level of one, the computing system may assign into that composition slot a first musical segment 102(1) that is designed as described in relation to FIG. 2.

In some implementations, arranging the individual musical segments into the individual composition slots may include dropping one or more stem segments from a particular composition slot based on the intensity level of the particular composition slot with respect to an adjacent composition slot. For example, if two adjacent composition slots are assigned a complexity level of five, the computing system may drop one or more composition slots from one of these adjacent composition slots to accomplish musical variance in terms of complexity where a variance in intensity is lacking.

Figure 7:
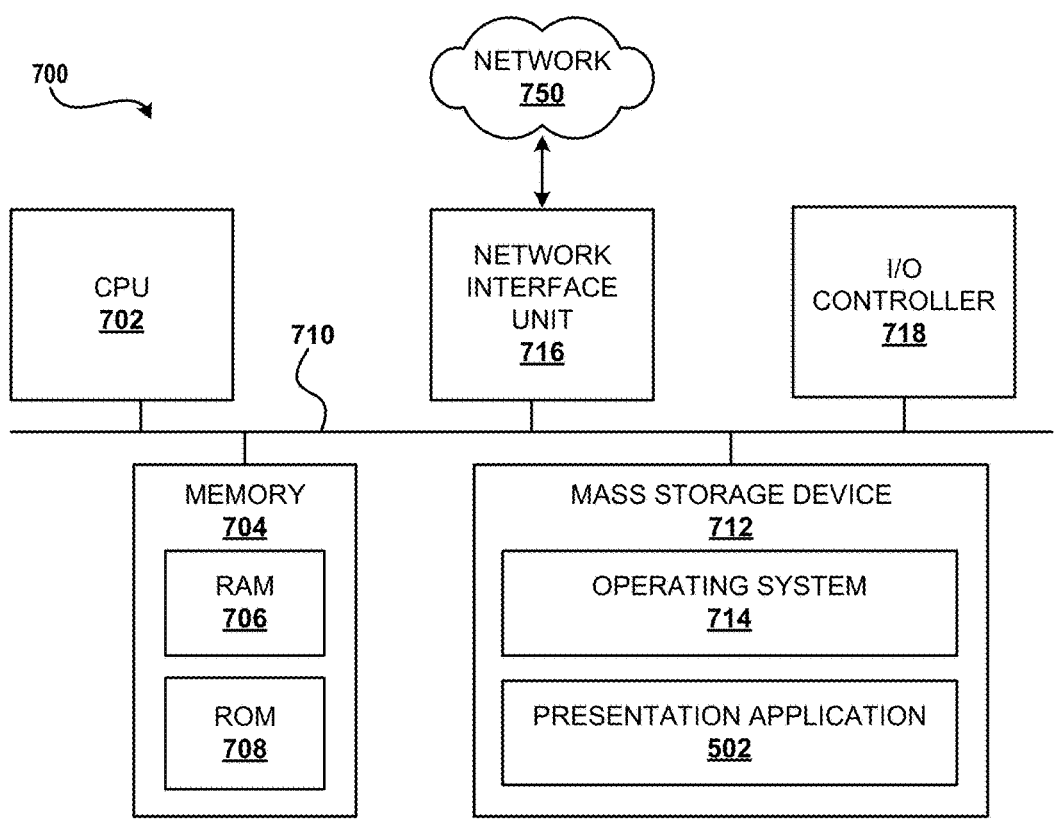
FIG. 7 shows additional details of an example computer architecture for a computer capable of executing the functionalities described herein.

FIG. 7 shows additional details of an example computer architecture for a computer capable of executing the functionalities described herein. The computer architecture 700 illustrated in FIG. 7 illustrates an architecture for a laptop computer, desktop computer, server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 (CPU), a system memory 704, including a random-access memory 706 (RAM) and a read-only memory (ROM) 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714, other data, and one or more application programs. For example, the mass storage device 712 may include a presentation application 502 that is configured to implement various functionalities and/or techniques as described herein.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium,"

"computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7).

It should also be appreciated that via a connection to the network 750 through a network interface unit 716, the computing architecture may enable communication with various components which perform various functionalities as described herein. For example, in some implementations, one or more functionalities as described herein may be performed as a "server-side" operation such that information is transmitted from a client device to a service that is implemented on a server. As a more specific but non-limiting example, a user may generate various parameters for an electronic presentation 110 such as, for example, an importance and/or duration of one or more slides. Then, the user may upload the electronic presentation 110 to server-side application and/or service that implements functionalities described herein such as, for example, generating the musical composition by arranging stem segments.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

The disclosure presented herein may be considered in view of the following clauses.

Example Clause A, a computer-implemented method for generating a musical composition by arranging musical segments according to content importance of an electronic presentation, the computer-implemented method comprising: receiving presentation data that includes a plurality of slides, wherein the presentation data defines an order for presenting the plurality of slides; receiving an input that designates an individual slide, of the plurality of slides, as a highlight slide for emphasizing during the electronic presentation; receiving stem data that defines a plurality of musical segments for adjoining at a plurality of segment boundaries to form the musical composition, wherein the stem data indicates intensity values for individual musical segments of the plurality of musical segments; determining, based on the presentation data, individual durations for individual composition slots of a plurality of composition slots, wherein the plurality of composition slots define the plurality of segment boundaries; assigning, based on the input that designates the highlight slide, individual intensity values to the individual composition slots to define assigned intensity values; and generating, based on the intensity values for the individual musical segments, the musical composition by arranging the individual musical segments into the individual composition slots according to the assigned intensity values.

Example Clause B, the computer-implemented method of Example Clause A, wherein assigning the individual intensity values to the individual composition slots includes: identifying a particular composition slot, of the plurality of composition slots, that corresponds to the highlight slide; assigning a first intensity level to the particular composition slot; and assigning at least one second intensity level, that is different than the first intensity level, to one or more other composition slots that are adjacent to the particular composition slot to form a musical crescendo in association with the highlight slide.

Example Clause C, the computer-implemented method of any one of Example Clauses A through B, identifying that two adjacent composition slots are commonly assigned a particular intensity level, and assigning different complexity levels to the two adjacent composition slots to cause: a first number of stem segments to be played in association with a first composition slot of the two adjacent composition slots, and a second number of stem segments to be played in association with a second composition slot of the two adjacent composition slots.

Example Clause D, the computer-implemented method of Example Clause C, further comprising allocating individual stem segments into individual composition slots based on at least one complexity array.

Example Clause E, the computer-implemented method of any one of Example Clauses A through D, further comprising: causing a display of a genre-selection graphical user interface (GUI) comprising a plurality of user interface (UI) elements that corresponds to a plurality of musical genres, wherein the genre-selection GUI enables selection of individual UI elements to indicate selection of individual musical genres; and receiving, by way of the genre-selection GUI, a second input that designates a particular musical genre, of the plurality of musical genres, as a selected musical genre for generating the musical composition, wherein the stem data that defines the plurality of musical segments corresponds to the particular musical genre.

Example Clause F, the computer-implemented method of Example Clause E, further comprising: monitoring user-input activity corresponding to the genre-selection GUI to identify an input-gesture in association with the particular musical genre; and responsive to the input-gesture, causing an audio output-device to play an audio sample of the particular musical genre.

Example Clause G, the computer-implemented method of any one of Example Clauses A through F, further comprising: determining a number of slide transitions to occur during the electronic presentation; and generating, based on the musical composition and the number of slide transitions, slide progression data that indicates at least some computer-defined durations for displaying at least some of the plurality of slides during the electronic presentation.

Example Clause H, the computer-implemented method of Example Clause G, further comprising: receiving a second input that indicates a user-defined duration for displaying a particular slide of the plurality of slides during the electronic presentation; and updating, based on the second input, the slide progression data to indicate the user-defined duration for displaying the particular slide.

Example Clause I, a system, comprising: at least one processor; and at least one memory in communication with the at least one processor, the at least one memory having computer-readable instructions stored thereupon that, when executed by the at least one processor, cause the at least one processor to: receive presentation data that defines an order for presenting a plurality of slides of an electronic presentation, wherein the presentation data includes an indication that an individual slide, of the plurality of slides, is a highlight slide for emphasizing during the electronic presentation; receive a plurality of musical segments for adjoining at a plurality of segment boundaries to form a musical composition; determine a plurality of composition slots that define the plurality of segment boundaries; based on the indication of the highlight slide, assign individual intensity values to individual composition slots to define assigned intensity values; and based on the assigned intensity values, arrange the individual musical segments into the individual composition slots in accordance with intensity values for the individual musical segments.

Example Clause J, the system of any one of Example Clause I, wherein the computer-readable instructions further cause the system to: based at least in part on the assigned intensity values, assign individual complexity values to the individual composition slots to define assigned complexity values; and allocate individual stem segments of the individual musical segments into the individual composition slots in accordance with the assigned complexity values.

Example Clause K, the system of any one of Example Clauses A through J, wherein the computer-readable instructions further cause the system to: receive a plurality of transitions for placement in association with a particular segment boundary of the plurality of segment boundaries; and determine a number of transitions to assign to the particular segment boundary based on at least one intensity level of a particular composition slot that defines the particular segment boundary.

Example Clause L, the system of any one of Example Clauses A through K, wherein the intensity values for the individual musical segments are indicative of a note structure density of the individual musical segments relative to other musical segments of the plurality of musical segments.

Example Clause M, the system of any one of Example Clauses A through L, wherein the intensity values for the individual musical segments are indicative of a volume of the individual musical segments relative to other musical segments of the plurality of musical segments.

Example Clause N, the system of any one of Example Clauses A through M, wherein the computer-readable instructions further cause the system to: determine, based on a default duration, individual durations for the individual composition slots; and allocate individual stem segments in accordance with the individual durations determined for the individual composition slots.

Example Clause O, the system of any one of Example Clauses A through N, wherein the individual musical segments include a plurality of stem segments that are associated with a plurality of musical types, and wherein individual stem segments of the plurality of stem segments correspond to at least one complexity array.

Example Clause P, the system of any one of Example Clauses A through O, wherein the computer-readable instructions further cause the system to: assign individual complexity values to the individual composition slots to define assigned complexity values; and based on the at least one complexity array, allocate the individual stem segments into the individual composition slots in accordance with the assigned complexity values.

Example Clause Q, a computer-implemented method, comprising: receiving presentation data that defines content of an electronic presentation; causing a display of a genre-selection graphical user interface (GUI) that enables selection between a plurality of musical genres; receiving, by way of the genre-selection GUI, a first input that indicates selection of a particular musical genre, of the plurality of musical genres, as a selected musical genre for generating a musical composition for the electronic presentation; receiving stem data that defines a plurality of musical segments that correspond to the selected musical genre, wherein the stem data indicates intensity values for individual musical segments of the plurality of musical segments; receiving, by way of the genre-selection GUI, a second input that indicates an importance level of an individual portion of the content; assigning, based on the second input, individual intensity values to individual composition slots of the musical composition to define assigned intensity values; and generating the musical composition by arranging the individual musical segments into the individual composition slots according to the assigned intensity values.

Example Clause R, the computer-implemented method of Example Clause Q, wherein the content includes a plurality of slides, and wherein the second input designates an individual slide as a highlight slide.

Example Clause S, the computer-implemented method of any of Example Clauses Q through R, further comprising: identifying a particular musical segment that has a highest intensity value of the plurality of musical segments; and allocating the particular musical segment into a particular composition slot that corresponds to the portion of the content.

Example Clause T, the computer-implemented method of any of Example Clauses Q through S, wherein complexity levels of the individual composition slots are varied based on the assigned intensity values.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

As described above, implementations of the disclosed techniques effectively reduce the exorbitant numbers of iterations of electronic presentations that are typically generated (and often unnecessarily stored rather than being discarded) prior a final version having slide transitions and energy levels that appropriately coincide with a music selection. It can be appreciated, therefore, that the disclosed techniques improve computing efficiencies by reducing processing cycles, memory usage, non-volatile storage usage, and in many cases network bandwidth (e.g., since few electronic presentations versions are unnecessarily uploaded to the "cloud").

What is claimed is:

1. A computer-implemented method for generating a musical composition by arranging musical segments according to content importance of an electronic presentation, the computer-implemented method comprising:
   receiving presentation data that includes a plurality of slides, wherein the presentation data defines an order for presenting the plurality of slides;
   receiving an input that designates an individual slide, of the plurality of slides, as a highlight slide for emphasizing during the electronic presentation;
   receiving stem data that defines a plurality of musical segments for adjoining at a plurality of segment boundaries to form the musical composition, wherein the stem data indicates intensity values for individual musical segments of the plurality of musical segments;
   determining, based on the presentation data, individual durations for individual composition slots of a plurality of composition slots, wherein the plurality of composition slots define the plurality of segment boundaries;
   assigning, based on the input that designates the highlight slide, individual intensity values to the individual composition slots to define assigned intensity values; and
   generating, based on the intensity values for the individual musical segments, the musical composition by arranging the individual musical segments into the individual composition slots according to the assigned intensity values.

2. The computer-implemented method of claim 1, wherein assigning the individual intensity values to the individual composition slots includes:
   identifying a particular composition slot, of the plurality of composition slots, that corresponds to the highlight slide;
   assigning a first intensity level to the particular composition slot; and
   assigning at least one second intensity level, that is different than the first intensity level, to one or more other composition slots that are adjacent to the particular composition slot to form a musical crescendo in association with the highlight slide.

3. The computer-implemented method of claim 1, further comprising:
   identifying that two adjacent composition slots are commonly assigned a particular intensity level, and
   assigning different complexity levels to the two adjacent composition slots to cause:
      a first number of stem segments to be played in association with a first composition slot of the two adjacent composition slots, and
      a second number of stem segments to be played in association with a second composition slot of the two adjacent composition slots.

4. The computer-implemented method of claim 3, further comprising allocating individual stem segments into individual composition slots based on at least one complexity array.

5. The computer-implemented method of claim 1, further comprising:
   causing a display of a graphical user interface (GUI) comprising a plurality of user interface (UI) elements that corresponds to a plurality of musical genres, wherein the GUI enables selection of individual UI elements to indicate selection of individual musical genres; and
   receiving, by way of the GUI, a second input that designates a particular musical genre, of the plurality of musical genres, as a selected musical genre for generating the musical composition, wherein the stem data that defines the plurality of musical segments corresponds to the particular musical genre.

6. The computer-implemented method of claim 5, further comprising:
   monitoring user-input activity corresponding to the GUI to identify an input-gesture in association with the particular musical genre; and
   responsive to the input-gesture, causing an audio output-device to play an audio sample of the particular musical genre.

7. The computer-implemented method of claim 1, further comprising:
   determining a number of slide transitions to occur during the electronic presentation; and
   generating, based on the musical composition and the number of slide transitions, slide progression data that indicates at least some computer-defined durations for displaying at least some of the plurality of slides during the electronic presentation.

8. The computer-implemented method of claim 7, further comprising:

receiving a second input that indicates a user-defined duration for displaying a particular slide of the plurality of slides during the electronic presentation; and updating, based on the second input, the slide progression data to indicate the user-defined duration for displaying the particular slide.

9. A system, comprising:

At least one processor; and at least one memory in communication with the at least one processor, the at least one memory having computer-readable instructions stored thereupon that, when executed by the at least one processor, cause the at least one processor to:

receive presentation data that defines an order for presenting a plurality of slides of an electronic presentation, wherein the presentation data includes an indication that an individual slide, of the plurality of slides, is a highlight slide for emphasizing during the electronic presentation;

receive a plurality of musical segments for adjoining at a plurality of segment boundaries to form a musical composition;

determine a plurality of composition slots that define the plurality of segment boundaries;

based on the indication of the highlight slide, assign individual intensity values to individual composition slots to define assigned intensity values; and based on the assigned intensity values, arrange the individual musical segments into the individual composition slots in accordance with intensity values for the individual musical segments.

10. The system of claim 9, wherein the computer-readable instructions further cause the system to:

based at least in part on the assigned intensity values, assign individual complexity values to the individual composition slots to define assigned complexity values; and allocate individual stem segments of the individual musical segments into the individual composition slots in accordance with the assigned complexity values.

11. The system of clam 9, wherein the computer-readable instructions further cause the system to:

receive a plurality of transitions for placement in association with a particular segment boundary of the plurality of segment boundaries; and determine a number of transitions to assign to the particular segment boundary based on at least one intensity level of a particular composition slot that defines the particular segment boundary.

12. The system of claim 9, wherein the intensity values for the individual musical segments are indicative of a note structure density of the individual musical segments relative to other musical segments of the plurality of musical segments.

13. The system of clam 9, wherein the intensity values for the individual musical segments are indicative of a volume of the individual musical segments relative to other musical segments of the plurality of musical segments.

14. The system of clam 9, wherein the computer-readable instructions further cause the system to:

determine, based on a default duration, individual durations for the individual composition slots; and allocate individual stem segments in accordance with the individual durations determined for the individual composition slots.

15. The system of clam 9, wherein the individual musical segments include a plurality of stem segments that are associated with a plurality of musical types, and wherein individual stem segments of the plurality of stem segments correspond to at least one complexity array.

16. The system of clam 15, wherein the computer-readable instructions further cause the system to:

assign individual complexity values to the individual composition slots to define assigned complexity values; and based on the at least one complexity array, allocate the individual stem segments into the individual composition slots in accordance with the assigned complexity values.

17. A computer-implemented method, comprising:

receiving presentation data that defines content of an electronic presentation;

causing a display of a graphical user interface (GUI) that enables selection between a plurality of musical genres;

receiving, by way of the GUI, a first input that indicates selection of a particular musical genre, of the plurality of musical genres, as a selected musical genre for generating a musical composition for the electronic presentation;

receiving stem data that defines a plurality of musical segments that correspond to the selected musical genre, wherein the stem data indicates intensity values for individual musical segments of the plurality of musical segments;

receiving, by way of the GUI, a second input that indicates a relatively higher importance level of a particular portion of the content with respect to other portions of the content;

assigning, based on the second input, individual intensity values to individual composition slots of the musical composition to define assigned intensity values, wherein a particular assigned intensity value for a particular composition slot, that at least partially temporally overlaps with the particular portion of the content, correlates to the relative importance level of the particular portion with respect to the other portions of the content; and generating the musical composition by arranging the individual musical segments into the individual composition slots according to the assigned intensity values.

18. The computer-implemented method of claim 17, wherein the content includes a plurality of slides, and wherein the second input designates an individual slide as a highlight slide.

19. The computer-implemented method of claim 18, further comprising:

identifying a particular musical segment that has a highest intensity value of the plurality of musical segments; and allocating the particular musical segment into the particular composition slot that corresponds to the particular portion of the content.

20. The computer-implemented method of claim 17, wherein complexity levels of the individual composition slots are varied based on the assigned intensity values.

* * * * *